Figure 1:
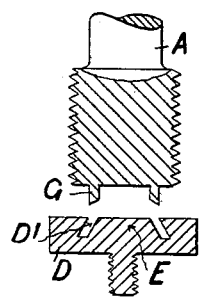

No. 638,564. Patented Dec. 5, 1899.
J. R. DAVIES.
JOINT PERMITTING OF INDEPENDENT ROTATION OF THE TWO PARTS.
(Application filed July 1, 1899.)
(No Model.)

Witnesses:

Inventor:
James Richard Davies
by
Atty.

UNITED STATES PATENT OFFICE.

JAMES RICHARD DAVIES, OF LUTON, ENGLAND, ASSIGNOR TO HAYWARD TYLER & CO., OF LONDON, ENGLAND.

JOINT PERMITTING OF INDEPENDENT ROTATION OF THE TWO PARTS.

SPECIFICATION forming part of Letters Patent No. 638,564, dated December 5, 1899.

Application filed July 1, 1899. Serial No. 722,590. (No model.)

*To all whom it may concern:*

Be it known that I, JAMES RICHARD DAVIES, a subject of the Queen of Great Britain and Ireland, residing at Luton, in the county of Bedford, England, have invented a certain new and useful Improved Joint Permitting of Independent Rotation of the Two Parts, Specially Applicable to a Valve and Its Spindle; and I do hereby declare the following to be a full, clear, and exact description of the invention, such as will enable others skilled in the art to which it appertains to make and use the same, reference being had to the accompanying drawings, and to letters of reference marked theron, which form a part of this specification.

This invention relates to an improved joint permitting of independent rotation of the two parts; and it is, for example, specially applicable to the connection of a valve and its spindle.

According to this invention the end of one part—say the spindle—is provided with an annular projection or ridge or with a number of such annular projections, and the other part—say the jumper or valve—is provided with an annular recess or a number of such recesses, the diameter or diameters of which at the top is or are larger or smaller than the diameter or diameters at the bottom, or instead of providing the end of the spindle with an annular ridge or a number of such ridges and the jumper or valve with a corresponding recess or number of recesses the spindle may be recessed and the jumper or valve may have the ridges thereon or the spindle may have a ridge or ridges and a recess or recesses, and the jumper or valve may have a recess or recesses and a ridge or ridges. The two parts are forced together end to end, and, for example, the annular ridge on the one part is forced into the annular recess in the other part, the result being that the ridge is deformed—that is to say, its diameter when at the bottom of the groove intended for its reception is expanded or contracted, all according to the shape of the groove, and the two parts are held firmly together, while allowing of the free revolution of one part on the other; and a particular feature of this invention consists therein that the parts may be made without any undercutting—that is to say, the ridges and the grooves may be made in any ordinary lathe by one motion of the tool or cutter. If desired, spinning or squeezing of one or both of the parts to be attached together may be resorted to in some constructions in addition to the automatic deformation of the ridge or ridges of the one part when it is or they are forced into the corresponding groove or grooves in the other part; but on the score of simplicity it is preferable to dispense with any such additional spinning or squeezing.

Figure 2:
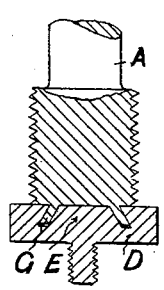
Figure 3:
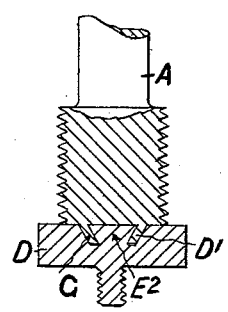
Figure 4:
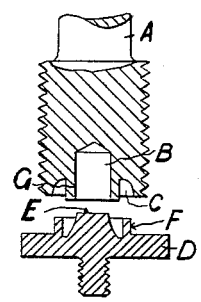
Figure 5:
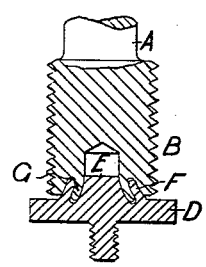
Figure 6:
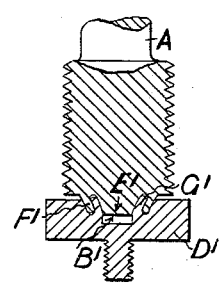
Figure 7:
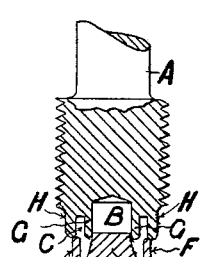
Figure 8:
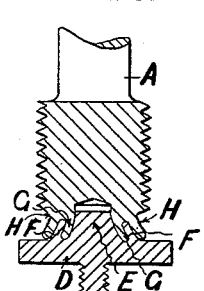
Figure 9:
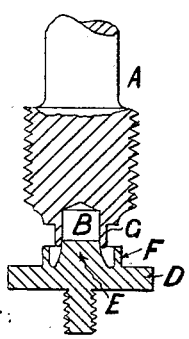
Figure 10:
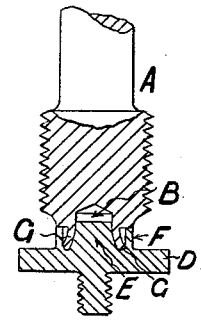
Figure 11:
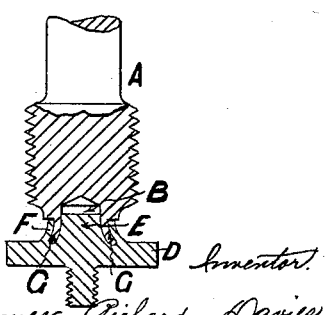

Figure 1 of the accompanying sheet of drawings represents a valve-spindle, partly in elevation and partly in section, and a jumper or upper part of a valve in section before the two are connected. Fig. 2 is a similar view and represents the two parts forced together; and Fig. 3 is also an elevation, partly in section, showing an alternative construction. Fig. 4 is an elevation, partly in section, of a modified construction before the two parts are connected; and Fig. 5 is a similar view of the said modified construction, showing the two parts connected. Fig. 6 represents yet another modification, in which the valve-spindle is partly in elevation and partly in section. Fig. 7 is an elevation, partly in section, of an alternative construction, showing the parts before they are connected; and Fig. 8 shows them connected. Figs. 9, 10, and 11 are elevations, partly in section, of another modification, showing the parts respectively before connection when partly connected and finally when entirely connected.

Referring to Figs. 1 and 2, one part—say the spindle A, Fig. 1—is provided with an annular projection or ridge G, and the other part—say the jumper D or the valve—is provided with an annular recess D', the inner wall of which forms a conical central stem E when the spindle A is brought near to the jumper D, valve, or other part to be connected thereto. The annular rim G enters the recess D', and on forcing the two parts together the cone E expands the rim G until the two parts are brought as close together as possible, as shown in Fig. 2; but the parts are not so locked as to prevent of their revolution independently of each other.

The construction shown in Fig. 3 is very similar to that just described, except that the diameter of the groove D' is smaller at the bottom than at the top, and consequently the conical part E is greater in diameter above than below. The diameter of the rim G is contracted as it enters the groove D'.

Referring to Figs. 4 and 5, it will be seen that one part—say, for example, the spindle A of a valve—is provided with a central recess B in its end face, and concentric therewith is a groove C, of which the outer side is curved or slanting toward the center, and the other or inner side of the groove is straight or thereabout. The other part—say the jumper D of the valve—as shown, (or it may be the valve itself,) is provided with a short central stem E, which is wholly or partly conical, and concentric to this stem is an annular projection or rim F, of which the sides are straight, or nearly so. When the spindle A is brought near to the jumper D, valve, or other part to be connected thereto, the short stem E of the jumper enters the central recess B, and on forcing the two together the aforesaid rim F is forced into the concentric recess C in the spindle, while the annular rim G on the spindle formed by the metal between the central recess B and the concentric groove C is displaced by the coned part of the central stem E of the jumper D. The result obtained, as shown in Fig. 5, is that the rim F is decreased in diameter at the top and the rim G on the spindle is correspondingly increased. The two concentric rims therefore interlock; but the spindle A and the jumper D or other part are not locked, so as to prevent of their revolution independently of each other.

Fig. 6 represents a modification in which the spindle A is provided with a cone E' and an annular rim F' and the jumper D has a recess B' and an annular rim G'.

In Fig. 7 the one part—say, for example, the valve-spindle A—is provided with a central recess B in its end face, and concentric therewith is a groove C, the sides of which are formed by the concentric rims G and H, and both these rims have their lower edges rounded off or chamfered. The jumper or other part D is provided with a short central stem E, which is wholly or partly conical, and concentric to this stem is an annular projection or rim F, of which the sides are straight, or nearly so, and the top edges rounded off or chamfered. When the spindle A is brought near to the jumper D, the short stem E of the jumper enters the central recess B, and on forcing the two parts together the aforesaid rim F is forced into the concentric recess C in the spindle, while the annular rim G on the spindle, formed by the metal between the central recess B and the concentric groove C, is displaced by the coned part of the central stem of the part D. The result obtained, as shown in Fig. 8, is that the rim F is decreased in diameter at the top, and the rims G and H on the spindle are correspondingly increased at the bottom. The concentric rims therefore interlock; but the parts A and D are not so locked as to prevent of their revolution independently of each other.

Referring to Figs. 9, 10, and 11, one part—say, for example, the spindle A of a valve—is provided with a central recess B in its end face. The other part—say the jumper D—of the valve, as shown, (or it may be valve itself,) is provided with a short central stem E, which is wholly or partly conical, and concentric to this stem is an annular projection or rim F, of which the sides are straight, or nearly so. When the spindle A is brought near to the jumper D, valve, or other part to be connected thereto, the short stem E of the valve enters the central recess B, and on forcing the two together the annular projection or rim G on the spindle, formed by the wall around the central recess B, is displaced by the coned part of the central stem E of the jumper D. The result obtained, as shown in Fig. 10, is that the rim G on the spindle is increased in diameter to conform to the shape of the coned part E. The outer rim F is, as shown in Fig. 11, then spun in or merely squeezed so as to conform to the contour of the inner rim G. The two concentric rims therefore interlock; but the spindle A and the jumper D or other part are not locked, so as to prevent of their revolution independently of each other.

As much bearing or steadying surface as is required may be arranged for outside of the rims and grooves on the two parts, or one may depend partially or wholly on the central stem or conical part and the corresponding central recess for bearing or steadying surface. It is also evident that it is not desired to limit one's self to the number of grooves and annular rims hereinbefore referred to and shown on the drawings, as the construction may be varied in several respects without departing from the invention.

I claim—

1. A joint permitting of independent rotation of the two parts the one part having a central coned stem, an annular groove and an annular rim and the other part being provided with a central hole, an annular rim and an annular groove substantially as set forth.

2. A joint permitting of independent rotation of the two parts the one part having a central coned stem and an annular rim and the other part being provided with a central hole and an annular groove or recess substantially as set forth.

3. A joint permitting of independent rotation of the two parts the one part having a central coned stem an annular groove and an annular rim and the other part being provided with a central hole, an annular rim an annular groove and another annular rim substantially as set forth.

4. A joint permitting of independent rotation of the two parts the one part having a central male coned stem, an annular groove and an annular rim and the other part having a central hole an annular groove and two annular rims each groove being provided with one sloping and one straight side, said parts being pressed together to interlock substantially as set forth.

In testimony that I claim the foregoing as my invention I have signed my name in the presence of two subscribing witnesses.

JAMES RICHARD DAVIES.

Witnesses:
ELIOT HOWARD,
WALTER J. SKERTEN.